Nov. 18, 1952 J. R. COOK 2,618,367
FLUID TRANSMISSION
Filed March 5, 1947 2 SHEETS—SHEET 2

*INVENTOR.*
JAMES R. COOK
BY *Victor J. Evans & Co.*
ATTORNEYS

Patented Nov. 18, 1952

2,618,367

UNITED STATES PATENT OFFICE 2,618,367

FLUID TRANSMISSION

James R. Cook, Pasadena, Calif.

Application March 5, 1947, Serial No. 732,636

6 Claims. (Cl. 192—3.2)

My present invention relates to the general class of combination rotary friction clutches and hydraulic or fluid couplings, and more specifically to an improved fluid transmission including a rotary friction clutch for a direct drive and a hydraulic coupling for a variable speed drive by means of which power is selectively transmitted from a power plant, motor, or rotary engine to a machine, automotive vehicle, or other appliance.

The primary object of the invention is the provision of power transmission mechanism of this type that includes a minimum number of component parts which may with facility be manufactured at low cost of production and assembled with convenience to insure a compactly arranged appliance that may readily be manually controlled for effective performance of its functions, and which is durable, simple in construction, and economical in maintenance.

The invention consists essentially in certain novel features of construction and combinations and arrangements of parts including a rotor or driven member of the coupling having adjustable blades and control means therefor for varying the speed in the transmission of power as will hereinafter be more fully described, and specifically set forth in the appended claims.

In the accompanying drawings I have illustrated one complete example of a physical embodiment of my invention wherein the parts are combined and arranged in accord with a preferred form I have devised for the practical application of the principles of my invention. It will, however, be understood that changes and alterations are contemplated and may be made in these exemplifying drawings, within the scope of my claims, without departing from the principles of the invention.

Figure 1:
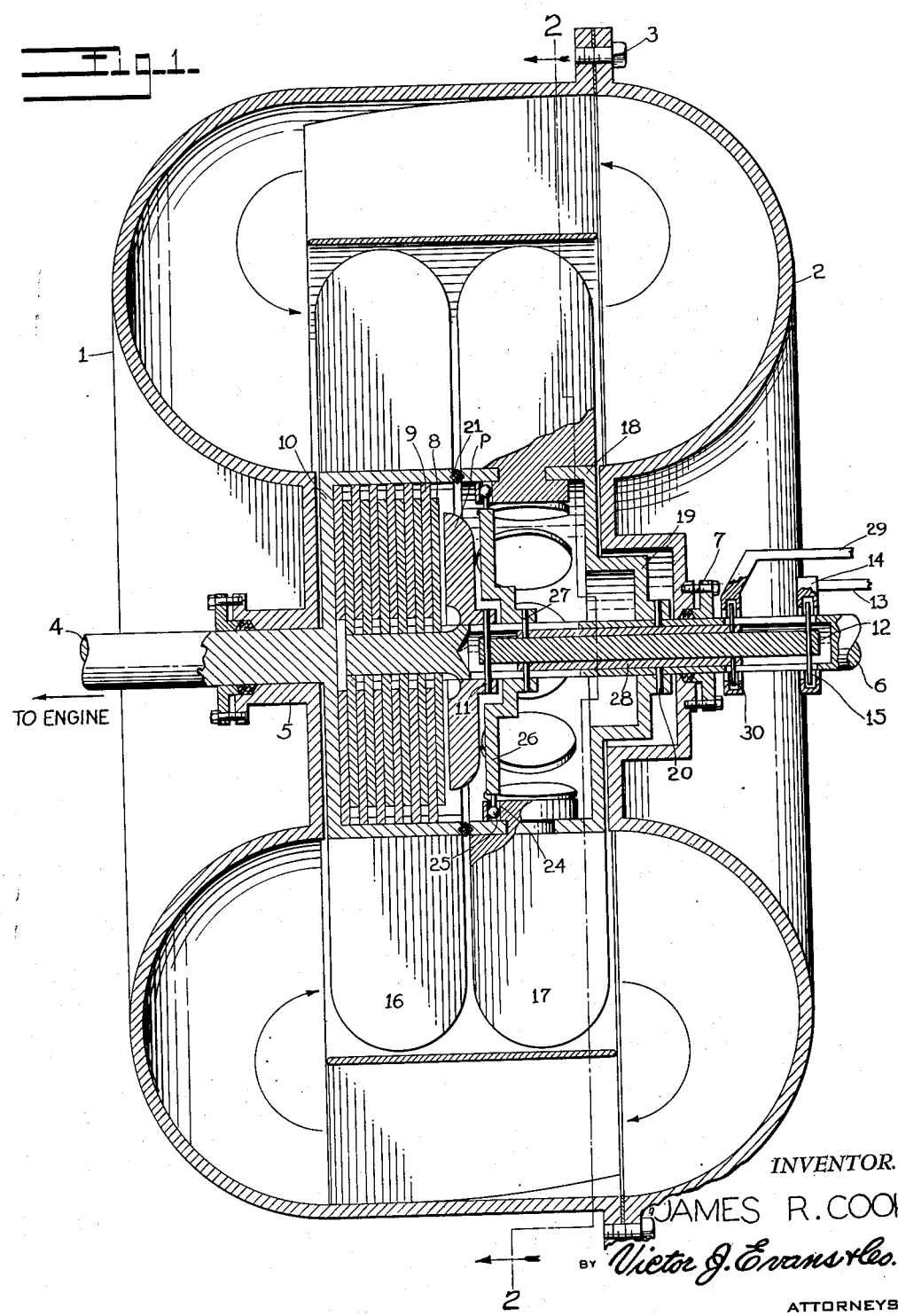
Figure 1 is a view in vertical section showing one embodiment of my invention.

In carrying out my invention I employ a stationary housing 1 having an attached head 2 that is secured by bolts 3, to provide an interior annular or circumferential fluid pressure chamber for the circulation of the motive fluid or heavy oil, as usually employed.

The engine shaft or driving shaft 4 is journaled in bearings as 5 of the housing, and an axially alined driven shaft 6, which is journaled at 7 in the central hub portion of the head 2, transmits power at variable speeds to the desired application of power.

The driven shaft 6 is provided with a tubular portion, and a solid end-portion within the hub assembly of the coupling, and the driven shaft may be coupled with the drive shaft for a direct drive through the instrumentality of a rotary friction clutch that includes multiple driven disks 8 carried by and keyed to the driven shaft, and alternating drive disks 9 mounted on and keyed within a cylindrical drive-head, or hub providing an impeller 10 that is rigid with the drive shaft. The alternating steel and brass friction disks 8 and 9 are longitudinally movable into close frictional engagement under pressure from a presser plate or head P that is rotatable with and slidable on the slotted tubular driven shaft or power shaft, and the presser head is fastened by cross pin 11 to a solid central clutch-operating rod or shaft 12 that is reciprocable longitudinally within the tubular driven shaft under manual control of an actuating lever 13, and its head 14 that is pinned at 15 to the clutch rod.

The driving head 10 of the friction clutch, which forms the impeller of the hydraulic coupling, is equipped with a series or group of radially extending and obliquely disposed non-adjustable blades 16 having a fixed feathering pitch and mounted upon the exterior of the impeller, as by welding, and these blades co-act with a complementary series of blades 17 that are adjustably mounted for variation in pitch upon a rotary driven head or rotor 18 of the hydraulic coupling. The rotor is provided with a central hub 19 that is rigidly pinned at 20 to the slotted tubular driven shaft 6, and a sealing ring 21 is interposed between the adjoining edges of the cylindrical impeller and rotor to prevent leakage of the motive fluid from the annular chamber of the coupling to the hub portion thereof.

Figure 2:
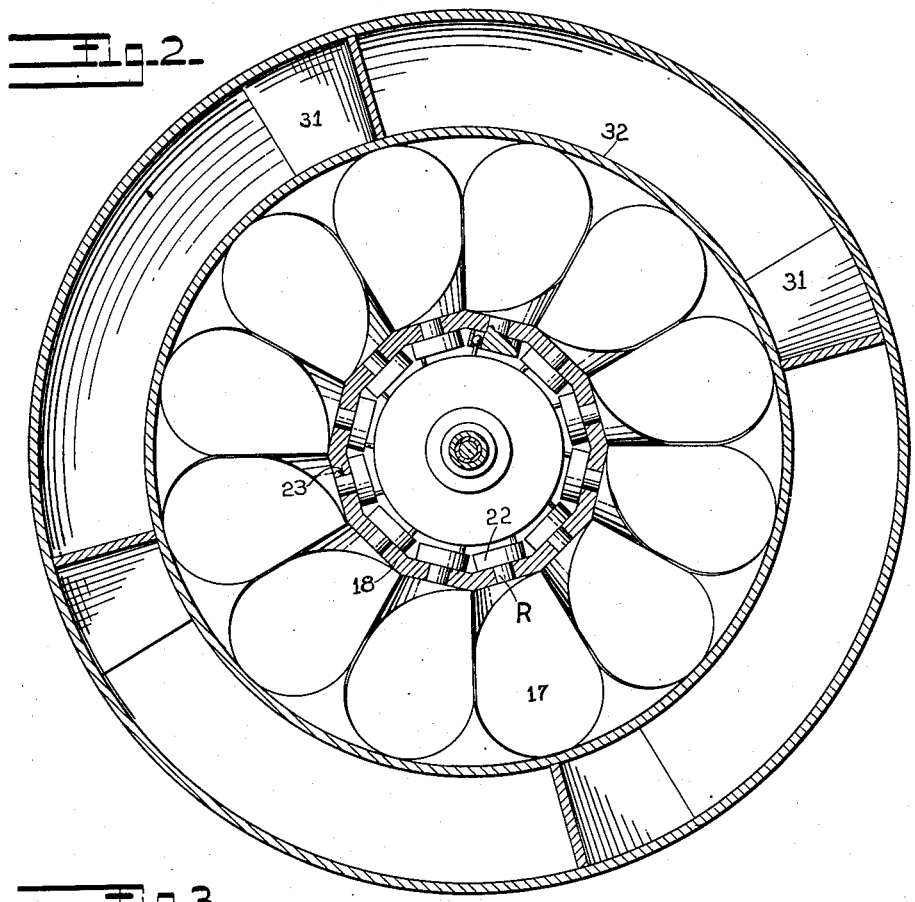
Figure 2 is a transverse sectional view at line 2—2 of Figure 1.

The multiple blades 17 are simultaneously adjusted with relation to the non-adjustable blades 16 for accomplishing the variations in speed between the drive shaft and driven shaft, and for this purpose, as best seen in Fig. 2, each of the variable pitch blades 17 is provided at its inner end or attaching end with a short integral pin R and a retaining head 22, and the headed pin is rotatably journaled in a bearing hole 23 of the multi-faced rotor 18.

For use in varying the pitch of the blades 17 each of the heads 22 is provided with an off-center or eccentric open-end socket 24, drilled through the head adjacent its rim to receive and retain a ball 25 that fits neatly within the socket.

The annular series of balls 25 is circumferentially spaced and rigidly mounted upon the exterior periphery of a partially rotatable and longitudinally slidable circular disk or adjusting head 26 that is rigidly pinned to, or otherwise united, at 27 with a short tubular adjusting sleeve 28 which is journaled concentrically of and between the clutch control rod 12 and the slotted tubular driven shaft 6.

By means of a manually controlled lever mechanism 29 which is pinned at 30 to the adjusting sleeve 28, the head 26 may be actuated to turn the swiveled blades 17 through the medium of the ball and socket connections for adjusting the pitch of these blades with relation to the non-adjustable blades 16 of the impeller.

As indicated in the drawings, a number of transversely arranged and angularly disposed vanes 31 (here shown as four in number) are rigidly mounted between the inner central portion of the housing and the outer periphery of an annular partition or ring 32 that is supported centrally of the housing by the vanes within the motive-fluid chamber, to surround the rotary impeller and rotor.

With the drive shaft and the impeller revolving the motive fluid or oil is thrown off the blades 16 in a spiral movement, against the adjusted rotor blades, and the impact results in rotary movement of the rotor; and this spiral movement of the fluid is accentuated by the degree of angularity of the vanes 31 as the fluid circulates around and across the annular partition and within the fluid chamber.

Figure 3:
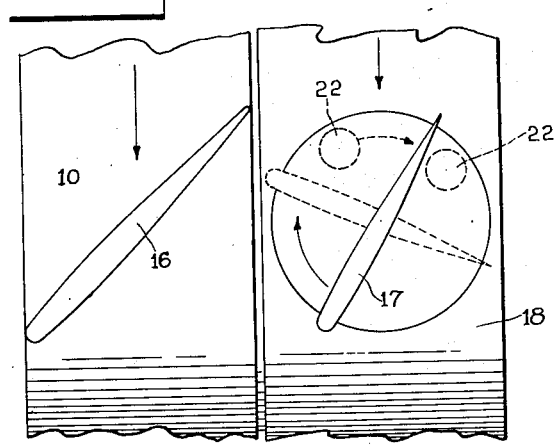
Figure 3 is a diagrammatic view illustrating the relation between the non-adjustable impeller-blades and the adjustable blades of the rotor or driven member of the coupling.

The speed of transmission through the coupling may be varied from zero or an idling movement of the rotor, up through a wide range to a maximum, by adjustment of the swiveled blades, as indicated in Fig. 3.

When the variable pitch blades 17 are in adjusted dotted line position of Fig. 3 the rotor 18 and the driven shaft are idling; and as the blades 17 are gradually adjusted toward the full line position the rotor may be driven to impart a speed to the driven shaft in excess of the speed of the drive shaft. If and when this maximum speed of the rotor is diminished to that of the impeller, the members of the friction clutch may be engaged, and thus both the friction clutch and the hydraulic coupling are utilized for a direct drive from the drive shaft to the driven shaft.

Having thus fully described my invention, what I claim as new and desire to secure by Letters Patent is:

1. A fluid transmission comprising a circular housing having an outer circumferential chamber, a drive shaft rotatably mounted in said housing having a cup-shaped hub on the inner end and having blades on the outer surface of the hub providing an impeller, said blades positioned in the outer circumferential chamber, a driven shaft having a tubular inner end with slots therein aligned with the drive shaft rotatably mounted in the housing and having a substantially similar cup-shaped hub on the inner end thereof with the hub thereof opposed to the hub of the drive shaft, a set of blades pivotally mounted on and carried by the hub of the driven shaft providing a rotor with the blades thereof complementary to and positioned to coact with the blades of the impeller, and each of the blades of the rotor having an eccentric open-end socket therein, means mounted for longitudinal sliding movement on said driven shaft having an annular series of balls removable in the sockets on the blades of the rotor for adjusting the pitch of the blades of the rotor, clutch disks positioned in the hub of the drive shaft, a pressure plate longitudinally slidable on the tubular inner end of the driven shaft, a rod in the tubular end of the driven shaft, means actuating the pressure plate by the rod through the slots of the tubular inner end of the driven shaft, and means manually actuating the rod through the driven shaft for driving the driven shaft by the driving shaft, said clutch disks coacting with the pressure plate.

2. A fluid transmission comprising a circular housing having an outer circumferential chamber, a drive shaft rotatably mounted in said housing having a cup-shaped hub on the inner end and having blades on the outer surface of the hub providing an impeller, said blades positioned in the outer circumferential chamber, a driven shaft having a tubular inner end with slots therein aligned with the drive shaft rotatably mounted in the housing and having a substantially similar cup-shaped hub on the inner end thereof with the hub thereof opposed to the hub of the drive shaft, a set of blades pivotally mounted on and carried by the hub of the driven shaft providing a rotor with the blades thereof complementary to and positioned to coact with the blades of the impeller, and each of the blades of the rotor having an eccentric open-end socket therein, means mounted for longitudinal sliding movement on said driven shaft having an annular series of balls removable in the sockets on the blades of the rotor for adjusting the pitch of the blades of the rotor, through the driven shaft, clutch disks positioned in the hub of the drive shaft, a pressure plate longitudinally slidable on the tubular inner end of the driven shaft, a rod in the tubular end of the driven shaft, means actuating the pressure plate by the rod through the slots of the tubular inner end of the driven shaft, and means manually actuating the rod through the driven shaft for driving the driven shaft by the driving shaft, said clutch disks coacting with the pressure plate.

3. A fluid transmission comprising a circular housing having an outer circumferential chamber, a drive shaft rotatably mounted in said housing having a cup-shaped hub on the inner end and having blades on the outer surfaces of the hub providing an impeller, said blades positioned in the outer circumferential chamber, a driven shaft having a tubular inner end with slots therein aligned with the drive shaft rotatably mounted in the housing and having a substantially similar cup-shaped hub on the inner end thereof with the hub thereof opposed to the hub of the drive shaft, a set of blades pivotally mounted on and carried by the hub of the driven shaft providing a rotor with the blades thereof complementary to and positioned to coact with the blades of the impeller, and each of the blades of the rotor having an eccentric open-end socket therein, mounted for longitudinal sliding movement on said driven shaft having an annular series of balls removable in the sockets on the blades of the rotor for adjusting the pitch of the blades of the rotor through the driven shaft, clutch disks positioned in the hub of the drive shaft, a pressure plate longitudinally slidable on the driven shaft and positioned to coact with the clutch disks in the hub of the drive shaft for driving the driven shaft, and means actuating the clutch through the driven shaft.

4. A fluid transmission comprising a circular housing having an outer circumferential chamber, a drive shaft rotatably mounted in said housing having a cup-shaped hub on the inner end and having blades on the outer surface of the hub providing an impeller, said blades positioned in the outer circumferential chamber, a driven shaft aligned with the drive shaft rotatably mounted in the housing and having a substantially similar cup-shaped hub on the inner end thereof with the hub thereof opposed to the hub of the drive shaft, a set of blades pivotally mounted on and carried by the hub of the driven shaft providing a rotor with the blades thereof complementary to and positioned to coact with the blades of the impeller, and each of the blades of the rotor having an eccentric open-end socket therein said driven shaft having a hollow tubular inner end, a sleeve longitudinally slidable in the tubular inner end of the driven shaft, means actuating the sleeve from a point on the driven shaft positioned outside of the housing, a circular adjusting head rigidly secured to the inner end of the sleeve, an annular series of balls circumferentially spaced and rigidly mounted upon the exterior periphery of the adjusting head and receivable in the sockets in the blades of the rotor for connecting the inner end of the sleeve to the blades on the hub of the driven shaft whereby the pitch of the blades may be adjusted, clutch disks positioned on the hub of the driving shaft, a pressure plate longitudinally slidable on the tubular inner end of the driven shaft, a rod in the tubular end of the driven shaft, means actuating the pressure plate by the rod through the slots of the tubular inner end of the driven shaft, and means manually actuating the rod through the driven shaft for driving the driven shaft by the driving shaft, said clutch disks coacting with the pressure plate.

5. A fluid transmission comprising a circular housing having an outer circumferential chamber, a drive shaft rotatably mounted in said housing having a cup-shaped hub on the inner end and having blades on the outer surface of the hub providing an impeller, said blades positioned in the outer circumferential chamber, a driven shaft aligned with the drive shaft rotatably mounted in the housing and having a substantially similar cup-shaped hub on the inner end thereof with the hub thereof opposed to the hub of the drive shaft, a set of blades pivotally mounted on and carried by the hub of the driven shaft providing a rotor with the blades thereof complementary to and positioned to coact with the blades of the impeller, and each of the blades of the rotor having an eccentric open-end socket therein said driven shaft having a hollow tubular inner end, a sleeve longitudinally slidable in the tubular inner end of the driven shaft, means actuating the sleeve from a point on the driven shaft positioned outside of the housing, a circular adjusting head rigidly secured to the inner end of the sleeve, an annular series of balls circumferentially spaced and rigidly mounted upon the exterior periphery of the adjusting head and receivable in the sockets in the blades of the rotor for connecting the inner end of the sleeve to the blades on the hub of the driven shaft whereby the pitch of the blades may be adjusted, clutch disks positioned in the hub of the driving shaft, a pressure plate slidably mounted on the driven shaft positioned to coact with the said clutch disks for driving the driven shaft, a rod longitudinally slidable in the sleeve of the tubular end of the driven shaft, means actuating the pressure plate by the inner end of the rod, and means actuating the rod from a point on the driven shaft outside the housing.

6. A fluid transmission comprising a circular housing having an outer circumferential chamber oval-shaped in cross-section, a drive shaft rotatably mounted in the center of said housing and having a cup-shaped hub on the inner end with blades on the outer surface of the hub providing an impeller, said blades positioned in the inner portion of the outer circumferential chamber of the housing, a driven shaft aligned with the drive shaft rotatably mounted in the housing and having a substantially similar cup-shaped hub on the inner end thereof with the hub opposed to the hub of the drive shaft, said driven shaft having a tubular inner end, a plurality of blades pivotally mounted on and carried by the hub of the driven shaft providing a rotor with the blades thereof complementary to and positioned to coact with the blades of the impeller, and each of the blades of the rotor having an eccentric open-end socket therein, a tubular adjusting sleeve mounted for longitudinal slidable movement on said driven shaft, a circular adjusting head on the inner end of said sleeve, an annular series of balls circumferentially spaced and rigidly mounted upon the exterior periphery of said adjustable head, said balls being receivable in the sockets in the blades of the rotor, means connected to said sleeve for adjusting the pitch of the blades of the rotor through the tubular inner end of the driven shaft from the exterior of the housing, a clutch positioned in the hub of the drive shaft, and means actuating the clutch through the tubular inner end of the driven shaft from a point outside of the housing whereby the driven shaft is driven directly by the drive shaft, said housing having a fluid providing an actuating medium therein.

JAMES R. COOK.

REFERENCES CITED

The following references are of record in the file of this patent:

UNITED STATES PATENTS

| Number | Name | Date |
| --- | --- | --- |
| 1,129,720 | Patterson | Feb. 23, 1915 |
| 1,304,566 | Hornbrook | May 27, 1919 |
| 1,469,564 | Marotta | Oct. 2, 1923 |
| 1,959,349 | Dodge | May 22, 1934 |
| 1,993,741 | Jandasek | Mar. 12, 1935 |
| 2,002,760 | Wilson | May 28, 1935 |
| 2,226,802 | Black | Dec. 31, 1940 |
| 2,382,034 | Wemp | Aug. 14, 1945 |
| 2,387,418 | Sundt | Oct. 23, 1945 |
| 2,506,989 | Black | May 9, 1950 |